(12) United States Patent
Blackett et al.

(10) Patent No.: US 6,792,337 B2
(45) Date of Patent: Sep. 14, 2004

(54) METHOD AND SYSTEM FOR MASTER SLAVE PROTOCOL COMMUNICATION IN AN INTELLIGENT ELECTRONIC DEVICE

(75) Inventors: Andrew W. Blackett, Victoria (CA); Bryan J. Gilbert, Victoria (CA); Martin A. Hancock, Victoria (CA)

(73) Assignee: Power Measurement Ltd. (CA)

( * ) Notice: Subject to any disclaimer, the term of this patent is extended or adjusted under 35 U.S.C. 154(b) by 56 days.

(21) Appl. No.: 10/024,896

(22) Filed: Dec. 17, 2001

(65) Prior Publication Data

US 2004/0138786 A1 Jul. 15, 2004

Related U.S. Application Data

(63) Continuation-in-part of application No. 09/723,564, filed on Nov. 28, 2000, which is a continuation-in-part of application No. 08/798,723, filed on Feb. 12, 1997, now abandoned, which is a continuation-in-part of application No. 08/369,849, filed on Dec. 30, 1994, now Pat. No. 5,650,936.

(51) Int. Cl.[7] .......................... G08F 19/00; G01R 21/00
(52) U.S. Cl. .......................... 700/295; 700/286; 702/62
(58) Field of Search .............................. 700/3, 22, 286, 700/295; 702/57, 58, 60–62, 64; 718/100

(56) References Cited

U.S. PATENT DOCUMENTS

| | | |
|---|---|---|
| 4,589,075 A | 5/1986 | Buennagel |
| 4,641,248 A | 2/1987 | Suzuki et al. |
| 5,181,026 A | 1/1993 | Granville ............... 340/870.28 |
| 5,448,229 A | 9/1995 | Lee, Jr. .................. 340/870.02 |
| 5,459,459 A | 10/1995 | Lee, Jr. .................. 340/870.02 |
| 5,477,216 A | 12/1995 | Lee, Jr. et al. .......... 340/870.02 |
| 5,495,239 A | 2/1996 | Ouellette ............... 340/870.02 |
| 5,517,423 A | 5/1996 | Pomatto ..................... 700/286 |
| 5,544,089 A * | 8/1996 | Hemminger et al. .......... 702/64 |
| 5,572,438 A | 11/1996 | Ehlers et al. ............... 700/295 |
| 5,576,700 A * | 11/1996 | Davis et al. ................. 700/295 |
| 5,680,324 A | 10/1997 | Schweitzer, III et al. |
| 5,699,276 A | 12/1997 | Roos |
| 5,736,847 A | 4/1998 | Van Doorn et al. |
| 5,764,155 A | 6/1998 | Kertesz et al. ............. 700/295 |
| 5,862,391 A | 1/1999 | Salas et al. ............. 395/750.01 |
| 5,897,607 A | 4/1999 | Jenney et al. ................. 702/62 |

(List continued on next page.)

OTHER PUBLICATIONS

Brochure, RTU+Server, source http://www.energyict.com/fh/media/tru_plus_server.pdf, pp. 1–3, Apr. 6, 2001.

(List continued on next page.)

Primary Examiner—Paul Rodriguez
(74) Attorney, Agent, or Firm—Brinks Hofer Gilson & Lione

(57) ABSTRACT

A power management architecture for an electrical power distribution system, or portion thereof, is disclosed. The architecture includes intelligent electronic devices ("IED's") with the capability to monitor and control attached slave devices, and provide capability to communicate between multiple devices in a variety of communication protocols. A master IED in the master/slave architecture performs power management functions on the data received from the slave IED's. Further, the IED's with master functionality provide web server capabilities, allowing a user to view processed data over an open Internet protocol, such as HTTP ("Hyper Text Transfer Protocol").

46 Claims, 10 Drawing Sheets

U.S. PATENT DOCUMENTS

| | | | |
|---|---|---|---|
| 5,956,220 A | 9/1999 | Novosel et al. ............... 361/62 |
| 6,005,759 A | 12/1999 | Hart et al. ..................... 361/66 |
| 6,035,285 A | 3/2000 | Schlect et al. |
| 6,088,659 A | 7/2000 | Kelley et al. ................. 702/62 |
| 6,105,093 A | 8/2000 | Rosner et al. ............. 710/105 |
| 6,118,269 A | 9/2000 | Davis |
| 6,167,389 A | 12/2000 | Davis et al. |
| 6,169,979 B1 | 1/2001 | Johnson |
| 6,177,884 B1 | 1/2001 | Hunt et al. ............ 340/870.02 |
| 6,178,362 B1 | 1/2001 | Woolard et al. |
| 6,259,972 B1 | 7/2001 | Sumic et al. ............... 700/286 |
| 6,266,713 B1 | 7/2001 | Karanam et al. .............. 710/9 |
| 6,285,917 B1 | 9/2001 | Sekiguchi et al. .......... 700/239 |
| 6,298,376 B1 | 10/2001 | Rosner et al. .............. 709/209 |
| 6,301,527 B1 | 10/2001 | Butland et al. ............. 700/286 |
| 6,313,752 B1 | 11/2001 | Corrigan et al. |
| 6,327,541 B1 | 12/2001 | Pitchford et al. ............. 702/62 |
| 6,535,797 B1 | 3/2003 | Bowles et al. .............. 700/286 |
| 6,549,880 B1 | 4/2003 | Willoughby et al. |
| 6,553,418 B1 * | 4/2003 | Collins et al. .............. 709/224 |
| 6,671,635 B1 * | 12/2003 | Forth et al. ................... 702/61 |
| 6,694,270 B2 | 2/2004 | Hart ........................... 702/57 |
| 2001/0010032 A1 | 7/2001 | Ehlers et al. |
| 2001/0039537 A1 * | 11/2001 | Carpenter et al. .......... 705/400 |
| 2002/0077729 A1 | 6/2002 | Anderson |
| 2002/0091784 A1 | 7/2002 | Baker et al. |
| 2002/0116550 A1 | 8/2002 | Hansen |
| 2002/0161536 A1 | 10/2002 | Suh et al. ..................... 702/62 |
| 2003/0176952 A1 | 9/2003 | Collins et al. .............. 700/286 |

OTHER PUBLICATIONS

Brochure, EiServer, The Energy Information server, source http://www.energyict.com/fh/media/EiServer.pdf, pp. 1–7, Jul. 14, 2000.

Advertisement, EiServer and RTU+Server, source, Metering International—2001 Issue 1, p. 19, publish date $1^{st}$ Quarter 2001, p. 1.

Article, "Providing Tomorrow's Energy Management and Metering Tools Today," source, Metering International—2001 Issue 1, p. 18, publish date $1^{st}$ Quarter 2001, p. 1.

"Email relating to the general technology of the application received from a competitor", from Erich W. Gunther [mailto:erich@electrotek.com] to Brad_Forth@pml.com sent May 9, 2001 3:36pm, pp. 1–2.

muNet News & Events Press Releases "muNet makes cable industry debut with its WebGate™ Internet Residential and Commercial Information Systems, and HomeHeartBeat", http://www.munet.com, pp. 1–2, Dec. 15, 1999.

muNet News & Events Press Releases "muNet's Web-Gate™ Systems Finds a Home on the Internet!" http://www.munet.com, pp. 1–2, Mar. 18, 1999.

MuNet News & Events Press Release "muNet Demonstrates End–To–Enc IP–Based Energy Management System at DistribuTECH," Feb. 5, 2000, pp 1–2.

Questra Applications Summary Data Sheet, pp. 1–2, Jul. 2, 2002.

Tridium™ Vykon™ Energy "JACE–401™" Product Data Sheet, pp. 1–2, Sep. 16, 2001.

Tridium™ Vykon™ Energy "Vykon Energy Profiler" Product Data Sheet, pp. 1–4, Oct. 16, 2001.

A8800–1 AcquiSuite Data Acquisition System specification, pp. 1–2, Sep. 24, 2001.

Power Monitoring home page, obtained from http://www.parijat.com/Power_Monitoring.htm, Oct. 9, 2002, one page,.

Press Release, "Connect One and NAMS Create the World's First Dial–up Energy Meter that Sends and Receives E–Mail Without a Gateway", Sep. 5, 2000, pp. 1–2.

NAMS Metals by Nisko, NMM–AKB Specifications p. 1 of 1, Sep. 5, 2000.

Connect One "Automatic Meter Reading via the Internet", pp. 1–2, Jul. 11, 2001.

ConnectOne™ Connecting your Device to the Internet™ iChip™ The Internet in your palm™, pp. 1–6, Jul. 11, 2001.

Engage Networks Inc. "Internet Protocol Card for Revenue Meters" brochure, pp. 1–2. Link present as of Mar. 3, 2000 on http://web.archive.org/web/20010306005433/www.engagenet.com/content/products.shtml. Original document archived at http://web.archive.org/web/20030520161648/http://www.engagenet.com/datasheets/ipcard.pdf on May 20, 2003.

Engage Networks Inc. "AEM" (Active Energy Management) brochure, pp. 1–2. Link present as of Mar. 3, 2000 on http://web.archive.org/web/20010306005433/www.engagenet.com/content/products.shtml. Original document archived at http://web.archive.org/web/20030520161850/http://www.engagenet.com/datasheets/aem.pdf.

webGate™ IRIS Technology, products brochure pp. 1–9. Applicants believe this reference was published prior to Jan. 9, 2003.

WebGate™ IRIS™ "Internet Residential Information System," p. 1 of 1 Published in Energy IT Nov./Dec. 2000 Technology Info Center. See http://www.platts.com/infotech/issues/0011/eittic0011.shtml for this reference—search for munet.com.

David Mueller and Sandy Smith, Electrotek Concepts, "Using Web–based Power Quality Monitoring for Problem Solving and Improving Customer Relations", proceedings of the $4^{th}$ Annual Latin American Power 99 Conference, Jun. 29, 1999, pp. 263–271.

Press Release—"Cannon Technologies Adds Support for ION® Web–Enabled Power and Energy Meters to its Energy Management Software", Jul. 27, 2001, found at http://www.pwrm.com/press/press_releases/a73.asp.

Press Release—"Web–Enabled ION® Power Meters By Power Measurement Use Modbus® Master to Extend Reach Across Factory Floor" Jul. 27, 2001, found at http://www.pwrm.com/press/press_releases/a74.asp.

Press Release—"Power Measurement Enhances Web Communications and Security Functions on ION® Energy and Power Quality Meters", May 23, 2001, found at http://www.pwrm.com/press/press_releases/a62.asp.

Nexus 1270 "High Performance Utility Billing Meter with Advanced Power Quality" brochure, Electro Industries/GaugeTech, pp. 1–8.

Nexus 1250 "Performance Power Meter & Data Acquisition Node" brochure, Electro Industries/GaugeTech, pp. 1–16.

ION® Technology "Modbus and ION Technology", technical note, ©2001 Power Measurement Ltd., pp. 1–14, rev. Dec. 5, 2001.

ION® Technology "MV90 and ION Technology", technical note, ©2001 Power Measurement Ltd., pp. 1–13.

ION® Enterprise "Enterprise Energy Management Software", application summary and features brochure, © Power Measurement Ltd., pp. 1–6, rev. Jul. 23, 2001.

ION® Technology "Internet Connectivity", technical note, ©2001 Power Measurement Ltd., pp. 1–17, rev. Aug. 8, 2001.

Powerlogic® Ethernet Communication Card specification bulletin, Square D Schneider Electric, Bulletin No. 3020HO0003, Aug. 2000, pp. 1–2.

ION® Technology "DNP 3.0 and ION Technology", technical note, ©2001 Power Measurement Ltd., pp. 1–11, rev. Jul. 17, 2001.

Powerlogic® Series 4000 Circuit Monitor bulletin, Square D Schneider Electric, Bulletin No. 3020HO0001, Apr. 2000, pp. 1–6.

6200 ION® "Compact Modular Power & Energy Meter", quick facts sheet, © Power Measurement Ltd., rev. Apr. 12, 2001, pp. 1–2.

ION® 8000 Series Meter User's Guide "Meter Connectivity", pp. 1–56, rev. May 8, 2001.

* cited by examiner

METHOD AND SYSTEM FOR MASTER SLAVE PROTOCOL COMMUNICATION IN AN INTELLIGENT ELECTRONIC DEVICE

RELATED APPLICATIONS

This application is a continuation-in-part under 37 C.F.R. § 1.53(b) of U.S. patent application Ser. No. 09/723,564, entitled "INTRA-DEVICE COMMUNICATIONS ARCHITECTURE FOR MANAGING ELECTRICAL POWER DISTRIBUTION AND CONSUMPTION", filed Nov. 28, 2000, the entire disclosure of which is hereby incorporated by reference. U.S. patent application Ser. No. 09/723,564 filed Nov. 28, 2000 is a continuation-in-part under 37 C.F.R. § 1.53(b) of U.S. patent application Ser. No. 08/798,723 filed Feb. 12, 1997, abandoned, which is a continuation-in-part under 37 C.F.R. § 1.53(b) of U.S. patent application Ser. No. 08/369,849 filed Dec. 30, 1994 now U.S. Pat. No. 5,650,936.

BACKGROUND

The monitoring of electric parameters, such as current, voltage, energy, power, etc., and particularly the measuring and calculating of electric parameters, provides valuable information for power utilities and their customers. Monitoring electric power is important to ensure that the electric power is effectively and efficiently generated, distributed and utilized. Knowledge about power parameters such as volts, amps, watts, phase relationship between waveforms, KWH, KVAR, KVARH, KVA, KVAH, power factor, frequency, etc., is a concern for utilities and industrial power users. In addition, monitoring electricity can be used for control and protection purposes.

Many metering functions in a power distribution system require concurrent knowledge of the states of multiple circuits or devices in the system to be communicated to a central command and control entity in order to work efficiently and effectively. However, a given power system rarely contains equipment from just one, or even just two, manufacturers. Within the power distribution or monitoring system, the various devices are often provided by multiple manufacturers and are configured to communicate with multiple different protocols.

Further, current metering devices in use are typically legacy or slave devices which are difficult to interface with and retrieve data from. These devices often require proprietary or custom software running on a central server or computer and thus data retrieval can often be complex or costly. In addition, such slave devices, as well as legacy devices, lack the advanced hardware or software, as well as the capability to be upgraded, to communicate in a modern client/server environment and interact using the open and non-proprietary protocols widely in use today.

Accordingly, is it is an object of the present invention to provide a system that overcomes the disadvantages of the prior art by integrating and consolidating the operations, communications and interactions of an electrical distribution system comprising a heterogeneous suite of inter-networked electrical metering devices as well as slave devices and loads, including legacy devices, for the purposes of protection, control and/or metering of electricity.

SUMMARY

The present invention is defined by the following claims, and nothing in this section should be taken as a limitation on those claims. By way of introduction, the preferred embodiments described below relate to an electrical distribution system architecture of electrical metering devices which are interconnected on a network. The metering devices further include capability to monitor and control attached slave devices, and provide capability to communicate between multiple devices in a variety of communication protocols.

The energy meter includes one or more sensors which are coupled with an electric circuit, the sensors operative to sense the electrical parameters in the circuit and generate analog signals which are representative of the electrical parameters. The analog signals are converted into digital samples using an analog to digital converter and a communications port facilitates communication of the digital signals to slave devices using a first protocol. The energy meter also includes a server module which allows for communication of the digital samples onto a digital network using a second protocol. In one embodiment the first and second protocols are the same and in an alternate embodiment the conversion between the first and second protocols is done on a processor internal to the energy meter.

According to a further aspect, there is provided a system for monitoring and controlling the distribution of electrical energy in an electric circuit. The system comprises a communications bus, a digital network and a master device. The master device comprises one or more sensors which are coupled with an electric circuit. The sensors are operative to sense the electrical parameters in the circuit and generate analog signals which are representative of the electrical parameters. The analog signals are converted into digital samples using an analog to digital converter and a communications port facilitates communication of the digital signals into a first protocol. The master device also includes a server module which allows for communication of the digital samples onto the digital network using a second protocol. The conversion between the first and second protocols is done on a processor internal to the master device. According to a further aspect, the system also includes the slave device.

Further aspects and advantages of the invention are discussed below in conjunction with preferred embodiments.

DETAILED DESCRIPTION

Figure 1A:
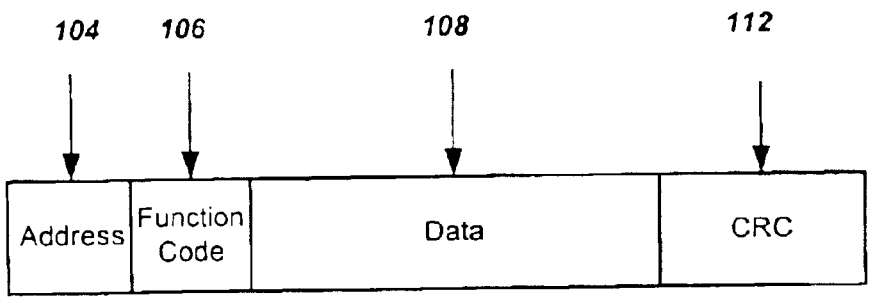
FIG. 1a illustrates the block diagram of a Modbus RTU packet.

Intelligent electronic devices ("IED's") such as programmable logic controllers ("PLC's"), Remote Terminal Units ("RTU's"), electric/watt hour meters, protection relays or fault recorders are available that make use of memory and microprocessors to provide increased versatility and additional functionality. Such functionality includes the ability to communicate with remote computing systems, either via a direct connection or via a network. In particular, the monitoring of electrical power, especially the measuring and calculating of electrical/power system parameters, provides valuable information for power utilities and their customers. The monitoring of electrical power is important to ensure that the electrical power is effectively and efficiently generated, distributed and utilized. Various different arrangements are available for monitoring, measuring, and controlling power system parameters.

Typically, an IED, such as an individual power measuring device, is placed on a given branch or line proximate to one or more loads which are coupled with the branch or line in order to measure, monitor or control power system parameters. Herein, the phrase "coupled with" is defined to mean directly connected to or indirectly connected through one or more intermediate components. Such intermediate components may include both hardware and software based components. In addition to monitoring power parameters of a certain load(s), such power monitoring devices have a variety of other applications, such as control applications. For example, power monitoring devices can be used in supervisory control and data acquisition ("SCADA") systems such as the XA/21 Energy Management System manufactured by GE Harris Energy Control Systems located in Melbourne, Fla.

In a typical SCADA application, IED's or other power monitoring devices individually dial-in to a central SCADA computer system via a modem. These dial in systems are often "stand alone" and require a secondary device, such as a dedicated computer, to send data in a predefined, typically proprietary, protocol. The resulting SCADA data is typically not easily/readily accessible by an external user using off the shelf computers. The ability to use an open, non-proprietary computer network infrastructure, such as the Internet, allows for the use of power parameter and data transmission and reporting on a large scale utilizing standard, open and non-proprietary protocols. The Internet provides a connectionless point-to-point communications medium that is capable of supporting standard protocols which are available in virtually every computer connected to the Internet.

As used herein, Intelligent electronic devices ("IED's") include Programmable Logic Controllers ("PLC's"), Remote Terminal Units ("RTU's"), electric power meters, protective relays, fault recorders or other devices which are coupled with power distribution networks to manage and control the distribution and consumption of electrical power. Such devices typically utilize memory and microprocessors executing software to implement one or more desired power management functions. IED's include on-site devices coupled with particular loads or portions of an electrical distribution system and are used to monitor and manage power generation, distribution and consumption. IED's are also referred herein as power management devices ("PMD's").

A Remote Terminal Unit ("RTU") is a field device installed on an electrical power distribution system at the desired point of metering. It is equipped with input channels (for sensing or metering), output channels (for control, indication or alarms) and a communications port. Metered information is typically available through a communication protocol via a serial communication port. An exemplary RTU is the XP Series, manufactured by Quindar Productions Ltd. in Mississauga, Ontario, Canada.

A Programmable Logic Controller ("PLC") is a solid-state control system that has a user-programmable memory for storage of instructions to implement specific functions such as Input/Output (I/O) control, logic, timing, counting, report generation, communication, arithmetic, and data file manipulation. A PLC consists of a central processor, I/O interface, and memory. A PLC is designed as an industrial control system. An exemplary PLC is the SLC 500 Series, manufactured by Allen-Bradley in Milwaukee, Wis.

A meter is a device that records and measures power events, power quality, current, voltage waveforms, harmonics, transients and other power disturbances, in addition to measuring the amount of electrical power delivered/consumed. Revenue accurate meters ("revenue meters") relate to revenue accuracy electrical power metering devices with the ability to detect, monitor, report, quantify and communicate power quality information, as well as revenue accurate information, about the power which they are metering. An exemplary meter is the model 8500 meter, manufactured by Power Measurement Ltd, in Saanichton, B.C. Canada.

A protective relay is an electrical device that is designed to interpret input conditions in a prescribed manner, and after specified conditions are met, to cause contact operation or similar abrupt change in associated electric circuits. A relay may consist of several relay units, each responsive to a specified input, with the combination of units providing the desired overall performance characteristics of the relay. Inputs are usually electric but may be mechanical, thermal or otherwise, or a combination thereof. An exemplary relay is the type N and KC, manufactured by ABB in Raleigh, N.C.

A fault recorder is a device that records the waveform and digital inputs, such as breaker status which result from a fault in a line, such as a fault caused by a break in the line. An exemplary fault recorder is the IDM, manufactured by Hathaway Corp in Littleton, Colo.

IED's can also be created from existing/legacy electromechanical meters or solid-state devices by the addition of a monitoring and control device which converts the mechanical output, such as the rotation of the rotary counter, or pulse output into electrical pulses/digital data. An exemplary electromechanical meter is the AB1 Meter manufactured by ABB in Raleigh, N.C. Such conversion devices are known in the art. Herein, legacy refers to devices or platforms inherited from technology earlier than the current technology.

A system and way are disclosed herein that can bridge the gap between modern and legacy networks and protocols and expand the capability of the aforementioned devices and their proprietary communication protocols and solutions. The disclosed embodiments relate to a communications architecture that can be used for monitoring, protection and control of devices and electrical power distribution in an electrical power distribution system, where master IED's interact with other slave IED's and attached devices, legacy or otherwise, and provide measured or computed data over a network. These master IED's, which typically have IED capabilities as well, offer both a connection between modern and legacy network protocols as well as server capabilities. Further, server capabilities include web, HTTP, FTP, NNTP, instant messaging, email and other network based servers. The server capabilities will be described in detail below. Also described in more detail below is a power management architecture for an electrical power distribution system, or portion thereof. The architecture is also described in the above captioned related application. The architecture provides a medium for a master device to communicate with several slave or peer devices and provide data, formatted or otherwise, retrieved therefrom, via alternate readily accessible formats and protocols.

Further, the architecture allows for a master IED to operate or manage the distribution and consumption of electrical power of devices through one or more intermediate slave devices. This architecture is created with IED's distributed throughout the power distribution system to monitor and control the flow of electrical power. IED's may be positioned along the supplier's distribution path and/or within a customer's internal distribution system. IED's include revenue electric watt-hour meters, protection relays, programmable logic controllers, remote terminal units, fault recorders and other devices, as described above, used to monitor and/or control electrical power distribution, generation, transmission and consumption. As was noted, IED's also include legacy mechanical or electromechanical devices which have been retrofitted with appropriate hardware and/or software so as to be able to integrate with the power management architecture.

Typically, an IED is associated with a particular load or set of loads which are drawing electrical power from the power distribution system. As was described above, the IED may also be capable of receiving data from or sending as data to its associated load for the purposes of monitoring and control. Depending on the type of IED and the type of load the IED may be associated with, the IED implements/performs one or more power management functions such as measuring power consumption, controlling power distribution such as a relay function, monitoring power quality, measuring power parameters such as phasor components, voltage or current, controlling power generation facilities, scaling values or combinations thereof. For functions which produce data or other results, the IED can push the data onto the network to another IED, central server, or web browser client, automatically or event driven, or the IED can wait for a polling communication which requests that the data be transmitted to the requestor. A power management function is typically a self-contained function capable of being performed or directed by a single IED.

In addition, the IED is also capable of implementing an application component of a power management application or module utilizing the architecture. As further described below, a power management application includes components which are implemented on different portions of the power management architecture and communicate with one another via the architecture network. The operation of the power management application components and their interactions/communications implement the power management application. One or more power management applications may be utilizing the architecture at any given time and therefore, the IED may implement one or more power management application components at any given time. An exemplary power management application may be a system wide billing application which collects usage information from multiple locations throughout the power distribution system and aggregates the total usage for the purposes of billing the consumer. In this example, an application component to collect usage from an individual location and transmit it to a central billing server may be operating on each IED while another application component which collects and aggregates the usage information may be executing on the central billing server. The combination of these application components implements the overall billing application.

The architecture further includes a communications network. Preferably, the communication network is a publicly accessible data network such as the Internet or other network or combination of sub-networks that transmit data utilizing the transmission control protocol/Internet protocol ("TCP/IP") protocol suite. Such networks include private intranet networks, virtual private networks, extranets or combinations thereof and combinations which include the Internet. Alternatively, other communications network architectures may also be used. Each IED preferably includes the software and/or hardware necessary to facilitate communications over the communications network by the hardware and/or software which implements the power management functions and power management application components.

The hardware and/or software which facilitate network communications preferably include a communications protocol stack which provides a standard interface to which the power management functions hardware/software and power management application components hardware/software interact. As will be discussed in more detail below, in one embodiment, the communications protocol stack is a layered architecture of software components. In the preferred embodiments these layers or software components include an applications layer, a transport layer, a routing layer, a switching layer and an interface layer.

The applications layer includes the software which implements power management functions and the power management applications components. Further, the applications layer also includes the communication software applications which support the available methods of network communications. Typically, power management function software interacts with power management hardware to monitor and/or control the portion of the power distribution system and/or the load coupled with the IED. The application component further interacts with the power management function software to control the power management function or process data monitored by the power management function. One or both of the power management function software and the power management application component software interacts with the communication software applications in order to communicate over the network with other devices.

The communications software applications include electronic mail client applications such as applications which support SMTP, MIME or POP network communications protocols, security client applications such as encryption/decryption or authentication applications such as secure-HTTP or secure sockets layer ("SSL"), or other clients which support standard network communications protocols such as telnet, hypertext transfer protocol ("HTTP"), file transfer protocol ("FTP"), network news transfer protocol ("NNTP"), instant messaging client applications, or combinations thereof. Other client application protocols include extensible markup language ("XML") client protocol and associated protocols such as Simple Object Access Protocol ("SOAP"). Further, the communications software applications may also include client software applications which support peer to peer or instant messaging based communications. All of the communications software applications preferably include the ability to communicate via the security client software applications to secure the communications transmitted via the network from unauthorized access and to ensure that received communications are authentic, not compromised and received by the intended recipient. Further, the communications software applications include the ability for redundant operation through the use of one or more interface layer components, error detection and correction and the ability to communicate through firewalls or similar private network protection devices.

The communication software applications further include support for master protocols, also known as a master/slave protocols, which use a master device or application to control a network of slave devices. A master/slave protocol interaction typically involves the master initiating transactions and the slaves responding with the requested data or action. Slave devices are both legacy and modern devices which typically do not have their own capability to communicate on the power management architecture. However, it can be appreciated that a slave device may also be another IED, such as an energy meter, with the capability to communicate on the power management architecture, but which operates in a slave mode. A device with master functionality is utilized to connect with slave devices for several reasons. Master devices are utilized for providing a primary operator interface and managing overall system functions, collecting and analyzing data and initiating control actions to slave devices. Many slave devices may be legacy devices which may be only capable of monitoring their equipment, not controlling or performing functions in reaction to the measured data. Further, device cost, which may include equipment downtime or added maintenance, may deter an individual from replacing a legacy device with an alternate device or installing higher-cost master devices at every location. It therefore may be more feasible, from both a cost and functionality point, to control the slave devices or legacy device and their associated equipment with a master device. Additionally, a master device may be utilized to control several slave devices within a system. For example a user may want to monitor the usage of separate devices and aggregate the load usage. Connecting the two slave-devices to a master device can offer this functionality.

Further, master device functionality offers several advantages, such as improved network response speed, particularly over an Ethernet connection. The response time to a master device request is typically faster because the master device typically has the data requested available, having already retrieved it from the slave device. This reduces the network latency added by having to communicate all the way to the slave device. This also offers improved network scalability by reducing the load on centralized applications because each master device becomes responsible for polling its network of slave devices and providing the concentrated and/or aggregated data rather than having a centralized application responsible for polling every device on the network. Further, by providing intermediate data concentration and/or aggregation points with the master devices, overall Ethernet network bandwidth is reduced. The improved network response further offers improved security because master devices can poll slave devices in a particular period of time, as well as there are fewer expected communication timeouts in the slave devices with the reduced response time. Additionally, functions performed on the master device reduce network traffic. Further, master device functionality offers improved timing for display of data associated with slave devices. Master devices which offer the ability to make command and control decisions remove the time delay associated with transport of the data to a secondary or intermediate device. Further, master device functionality removes a failure point in the data logging. Further, the master device functionality allows for improved command and control by allowing the meter to directly control without the need to communicate over Ethernet.

Master protocols include industrial networking protocols such as Modbus RTU or other Modbus protocols such as Modbus Plus, Modbus TCP or Modbus ASCII, all developed and available from Modicon Corporation, now Schneider Electric, located in Andover, Mass. The Modbus protocol is an open and published protocol that requires a royalty-free license, which is widely used to establish communication between intelligent devices. Modbus generally defines a message structure that controllers recognize and use regardless of the type of network they communicate over. The Modbus messaging structure is independent of the physical layer, i.e. network hardware, and is commonly implemented using RS232, RS422 or RS485 serial protocols. Modicon® devices using Modbus RTU can communicate with each other and with any other devices over a variety of networks, such as an Ethernet or RS485 network.

The Modbus network, as defined by the protocol, is a single master, multi-drop (more than one device) system that supports up to 247 slave devices. Other examples of master protocols include Integrated Object Network ("ION"), Distributed Network Protocol ("DNP"), Lonworks, BACnet, Profibus or IEC 870 standard protocols. These master/slave protocols enable devices to communicate with each other and with other devices over a variety of networks. The master/slave protocol can also be applied in the peer-to-peer architecture where one device requests information from another peer.

All of these protocols define a message structure, i.e. a data format consisting of a defined ordering of binary data, and rules for communication interaction that controllers recognize and use regardless of the type of network they communicate over. These protocols are media independent. It will be appreciated by one skilled in the art that a master protocol can be transmitted over TCP/IP by wrapping/encapsulating it in the appropriate manner, however a master protocol master can also communicate directly over a particular media without using TCP/IP. For example, a ION protocol can be transmitted over a RS232 connection without the additional need for protocol wrapping.

Modbus master devices, also referred to as master devices, are usually software programs executing on computer workstations, such as Distributed Control Systems ("DCS"). Modbus master devices can also be devices such as Remote Terminal Units. Modbus slave devices are devices such as Programmable Logic Controllers, I/O monitoring devices, relays and meters. Software programs executing on computer workstations can also act as slave devices. A Modbus message sent from a master to a slave contains the address of the slave, a command, the requisite data and an error checksum (cyclic redundancy check ("CRC")).

Modbus comes in variants, the most common of which are Modbus RTU, Modbus ASCII, Modbus Plus and Modbus/TCP. Modbus RTU (binary) and Modbus ASCII are the two basic forms of the Modbus protocol. The ASCII form transmits each 8 bit byte using two ASCII characters from the ASCII character set ('0–9' and 'A–F'). The RTU form transmits all bytes in binary format, i.e. each byte is transmitted as 2 four bit hexadecimal characters, making the protocol faster and more efficient. Both forms utilize the serial RS-232/RS-485 protocols as the networking medium. Known limitations of these serial protocols, such as limited inter-device distances, have reduced the effectiveness of the Modbus RTU and ASCII protocols in modern industrial networking. Modbus Plus is a Modicon® proprietary protocol used in industrial networking systems. It uses token-passing peer-to-peer communications over a proprietary networking medium at data transfer rates of one megabit per second (high-speed passing of groups of bits within a layer). Typically the network medium is a shielded twisted-pair cable. The structure of Modbus/TCP is similar to the Modbus RTU packet except that it has an extra six-byte header and does not use the cyclic redundancy check ("CRC"). Modbus/TCP defines the packet structure and connection port for the industry standard TCP/IP protocol. Modbus/TCP retains the Modbus RTU limit of 256 bytes to a packet. A protocol variant referred to as Enhanced Modbus/TCP removes this limitation to allow a higher throughput is also utilized.

FIG. 1a illustrates a block diagram of a Modbus RTU Packet. The Modbus data packet 100 includes an ADDRESS field 104, a FUNCTION code field 106, a DATA field 108 and a cyclic redundancy check ("CRC") field 112. The ADDRESS field 104 contains either two characters (Modbus ASCII) or eight bits (Modbus RTU). An assigned slave device address is in the range of 1–247 decimal. A master addresses a slave by placing the slave address in the field of the message. When a slave responds it places its own address in the address field to let the master know which slave is responding.

The FUNCTION code field 106 contains either two characters (Modbus ASCII) or eight bits (Modbus RTU). Valid function codes are in the range of 1–255 decimal, each code in the range referring to an action the slave is to perform. Conversely, when the slave responds to the master, the function code field is utilized to indicate either a normal or error response. In operation the normal response echo's the original function code except that the error response, also referred to as the exception response, returns a code that is equivalent to the function code with it's most significant bit set to a logic 1.

The DATA field 108 is constructed using a set of two hexadecimal digits in the range of 00 to FF hex. Depending on the protocol variant, i.e. ASCII or RTU, they can be made from a pair of ASCII characters or from one RTU character. Typically the data field 108 is 16 bits in length for a RTU character but alternately the data field 108 can be zero length, or non-existent. For example the function code alone may specify the action and the slave does not require any additional data or information.

Figure 1B:
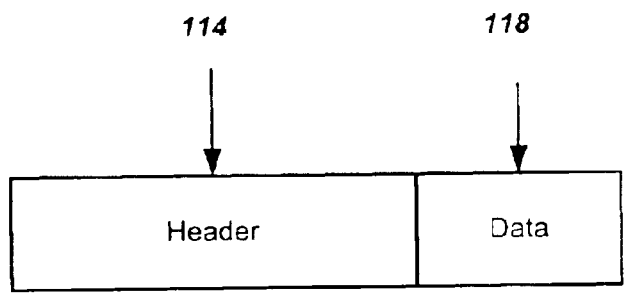
FIG. 1b illustrates the block diagram of an DNP packet.
Figure 1C:
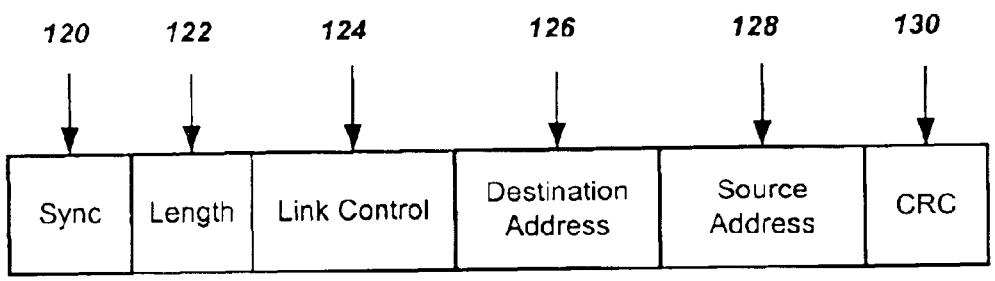
FIG. 1c illustrates the block diagram of a the Header frame within a DNP packet.

The Distributed Network Protocol ("DNP") is an open SCADA protocol which is used for communications and interoperability among substation computers, IED's and Master Stations. Originally developed by Harris, Distributed Automation Products in 1993, ownership has been given to the DNP3 Users Group, a group composed of utilities and vendors who are utilizing the protocol. Harris Distributed Automation is located in Melbourne, Fla. DNP is used for substation automation such as reclosing schemes automation, adaptive relaying, capacitor bank control, auto load transfer and bus tie control. DNP is not a general purpose protocol for transmitting hypertext, multimedia or huge files. DNP Version 3.0, or DNP3, is structured similarly to the Modbus protocol. The basic structure of a DNP3 packet is shown in FIG. 1b and contains a header frame 114 and a data frame 118. The header frame 114 structure is shown in FIG. 1c and includes a SYNC field 120, a length field 122, a link control field 124, a destination address 126, a source address 128 and a error check sum ("CRC") 130.

The SYNC frame 120 is two bytes and helps the receivers determine where the frame begins. The LENGTH 122 specifies the number of octets in the remainder of the frame, not including the CRC check octets 130. The LINK CONTROL octet 124 is used between sending and receiving link layers to coordinate their activities. A DESTINATION ADDRESS 126 specifies which DNP device should process the data and the SOURCE ADDRESS 128 identifies which DNP device sent the message. Every DNP device must have a unique address within the collection of devices sending and receiving messages to and from one another. As in the Modbus protocol, a CRC check provides a higher degree of assurance that communication errors are detected.

Figure 1D:
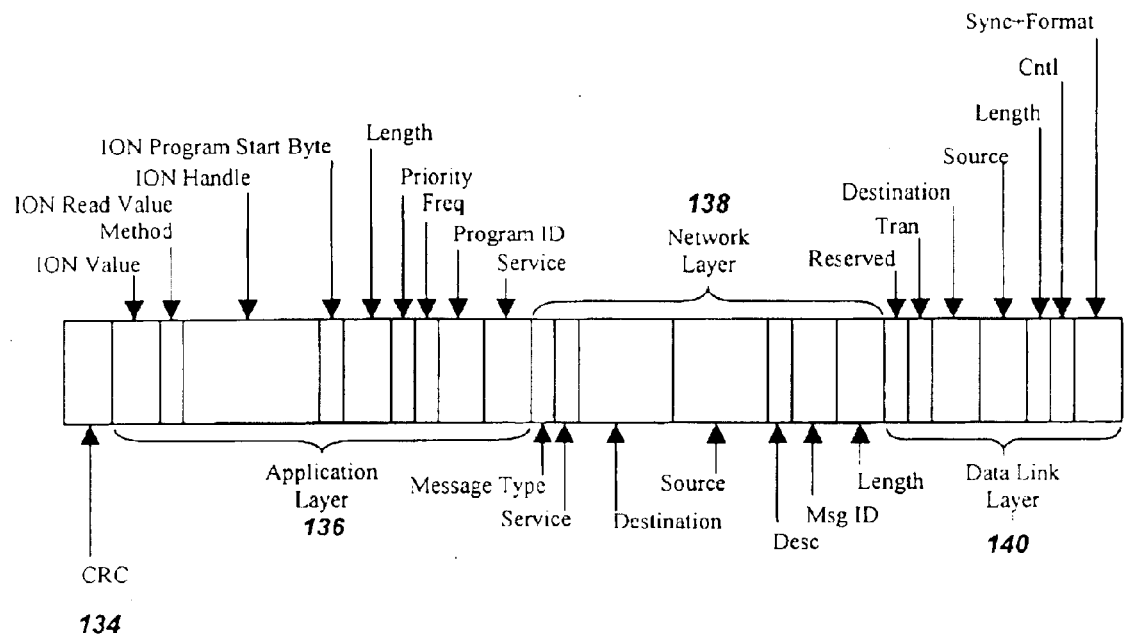
FIG. 1d illustrates the block diagram of an ION packet.
Figure 1E:
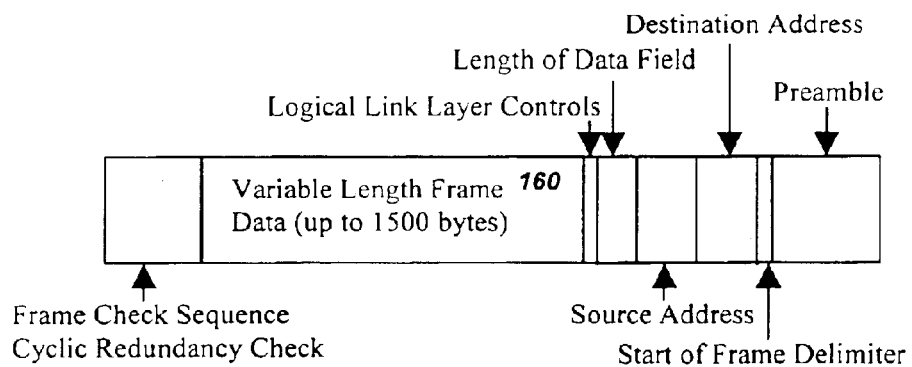
FIG. 1e illustrates the block diagram of an Ethernet packet.

The Integrated Object Network ("ION") protocol is another open protocol designed by Power Measurement Ltd., located in Saanichton, British Columbia. The ION packet, as shown in the block diagram in FIG. 1d, contains a CRC field 134, an Application layer 136, a Network layer 138 and a Data Link layer 140. For reference, a block diagram of an Ethernet packet is also shown in FIG. 1e.

Other protocols include the International Electrical Commission 870 part 5 ("IEC 870") protocol standard and the Building Automation and Control Network ("BACnet") protocol. The IEC 870 protocol supports telecontrol equipment and systems with coded bit serial data transmissions for monitoring and controlling processes. The BACnet protocol is adopted and supported by the American National Standards Institute ("ANSI") and the American Society of Heating Refrigeration and Air-Conditioning Engineers ("Ashrae"). BACnet is a non-proprietary open protocol communication standard conceived by a consortium of building management, system users and manufactures.

As described above, the internal software of the IED includes a TCP/IP protocol stack including the transport layer, routing layer, switching layer and the interface layer. The transport layer interfaces the applications layer to the routing layer and accepts communications from the applications layer that are to be transmitted over the network. The transport layer breaks up the communications into one or more packets, augments each packet with sequencing and addressing data and hands each packet to the routing layer. Similarly, packets which are received from the network are reassembled by the transport layer and the re-constructed communications are then handed up to the applications layer and the appropriate communications application client. The transport layer also ensures that all packets which make up a given transmission are sent or received by the intended destination. Missing or damaged packets are re-requested by the transport layer from the source of the communication. In the preferred embodiment, the transport layer implements the transport control protocol ("TCP").

The routing layer interfaces the transport layer to the switching layer. The routing layer routes each packet received from the transport layer over the network. The routing layer augments each packet with the source and destination address information. In the preferred embodiment, the routing layer implements the Internet protocol ("IP"). It will be appreciated that the TCP/IP protocols implement a connectionless packet switching network which facilitates scalable substantially simultaneous communications among multiple devices. The switching layer interfaces the routing layer to the interface layer. The switching layer and interface layer are typically integrated. The interface layer comprises the actual hardware interface to the network. The interface layer may include an Ethernet interface, a modem, such as a wired modem using the serial line interface protocol ("SLIP") or point to point protocol ("PPP"), a wired modem which may be an analog or digital modem such as a integrated services digital network ("ISDN") modem or digital subscriber line ("DSL") modem, or a cellular modem. Further, other wireless interfaces, such as satellite, Bluetooth or 802.11b compliant devices, may also be used. In addition, AC power line or network power line carrier data network interface may also be used. Cellular modems further provide the functionality to determine the geographic location of the IED using cellular RF triangulation. Such location information can be transmitted along with other power management data as one factor used In authenticating the transmitted data. In the preferred embodiments, the provided interface layer allows for redundant communication capabilities. The interface layer couples the IED with a local area network, such as provided at the customer or utility site. Alternatively, the interface layer can couple the IED with a point of presence provided by a local network provider such as an Internet service provider ("ISP").

Figure 2:
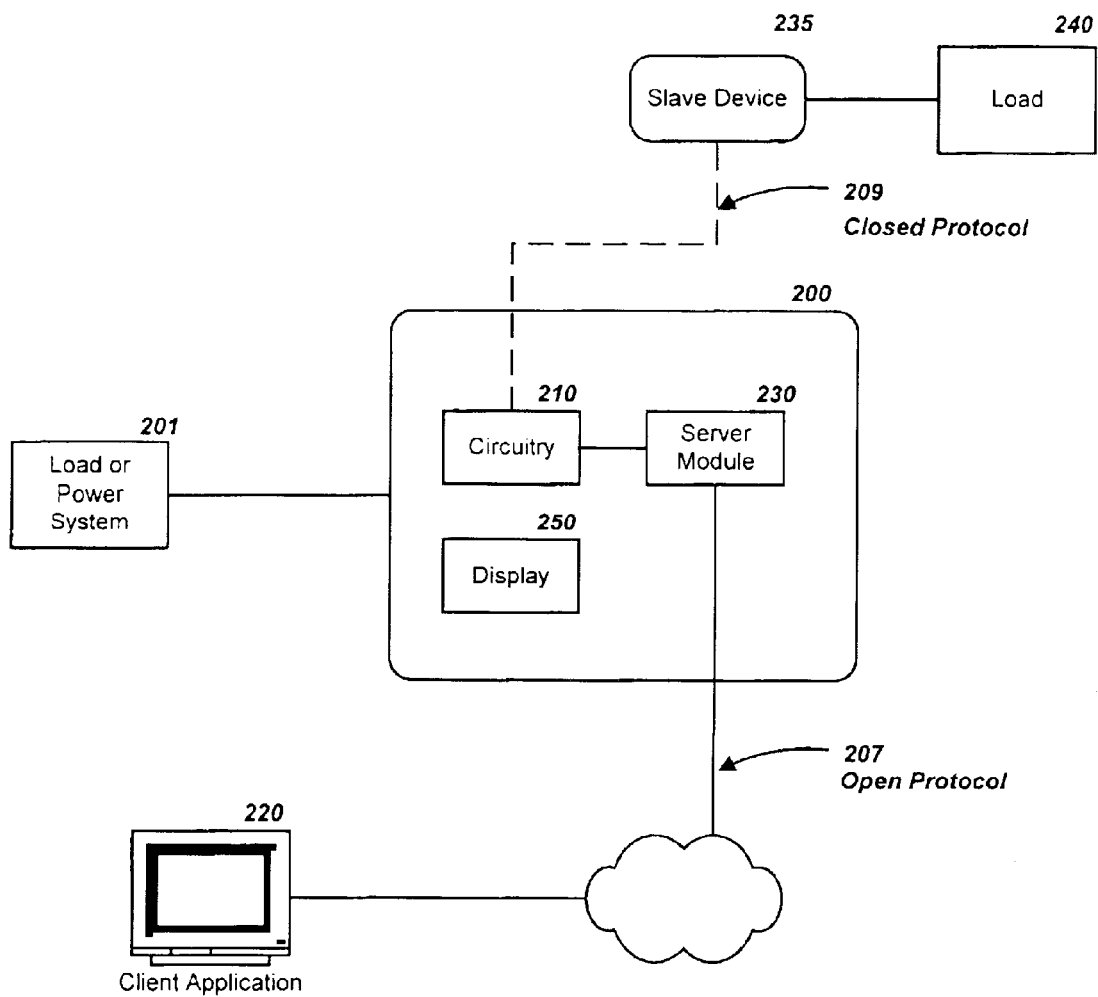
FIG. 2 illustrates an IED connected to a network, a slave device and a power system.
Figure 3:
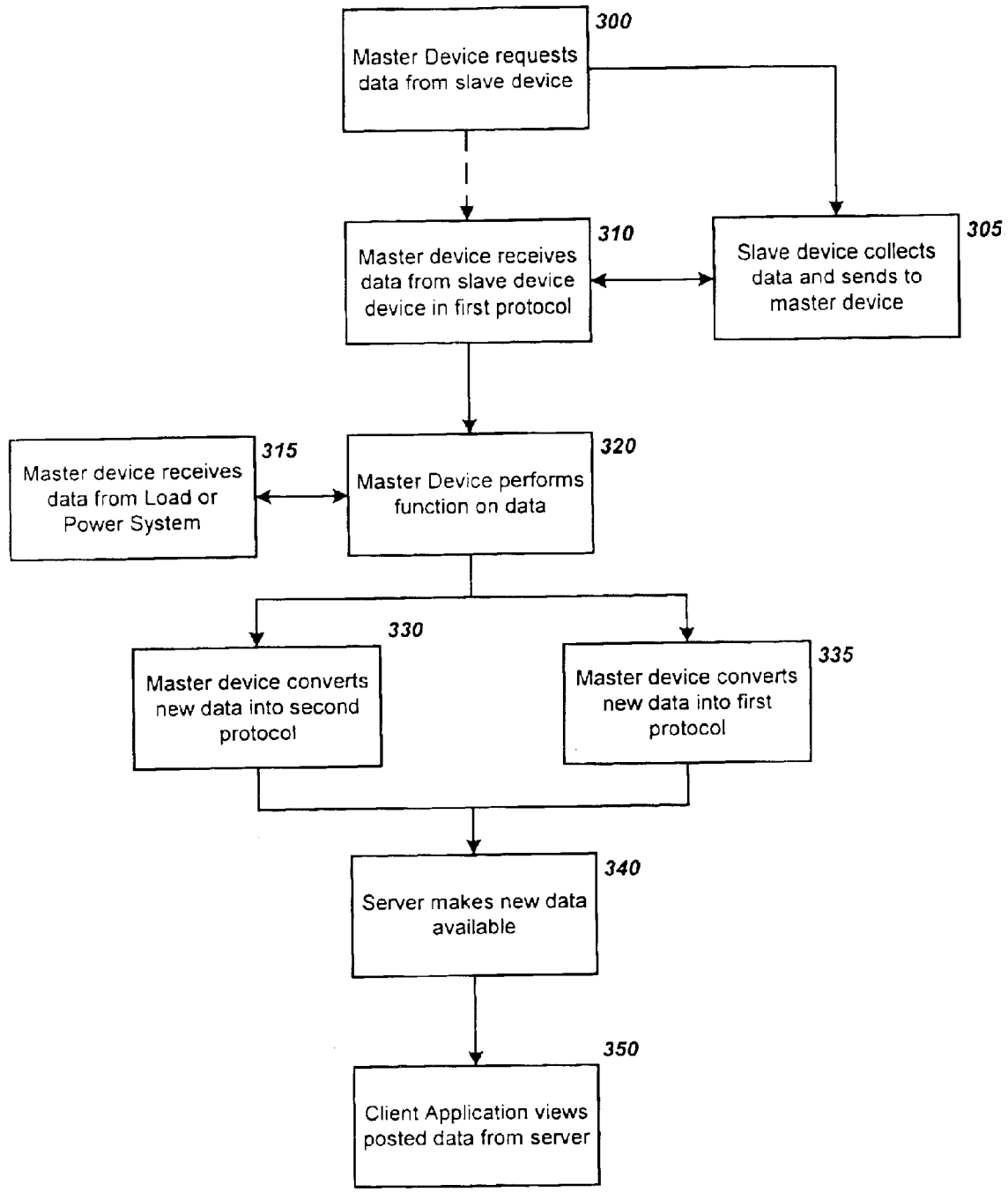
FIG. 3 illustrates an block diagram of the preferred embodiment.

Referring back to the figures, FIG. 2 illustrates a system overview of the preferred embodiment while FIG. 3 illustrates a flow diagram of how the master device makes data available to the client application. FIG. 2 shows an exemplary IED 200 having master/slave communication capabilities. The IED 200 is coupled with a load/power system 201 for the purpose of monitoring and/or control. Further, the IED 200 is coupled with a slave device 235 via a closed/proprietary network protocol 209 such as. ION or Modbus RTU. The slave device 235 is further coupled with a load for the purpose of monitoring and/or control. The IED 200 is also coupled with an open/non-proprietary network 207 such as the Internet for the purpose of communicating with remote devices and/or applications 220. The IED master/slave device 200 further contains device circuitry 210 and a server module 230. The device circuitry 210 will be described in detail later. The server module 230 contains communications capability and web server capability, and interacts with internal hardware and/or software, such as software applications, in the device circuitry 210. It will be appreciated that there may be more than one server module 230 supporting one or more of the TCP/IP based networking protocols described above. The circuitry 210 connects with a slave device 235 over a closed network 209, which communicates using a proprietary or closed master/slave protocol such as ION or Modbus RTU. It will be appreciated that there may be more than one circuitry 210 for connecting with more than one slave device 235 or the circuitry 210 may be capable of connecting with more than one slave device 235. The server module 230 connects with a client application 220, such as a web browser, over an open network 207, which communicates using an open non-proprietary protocol such as HTTP. It will be appreciated that the server module 230 may also have the capability to connect with the slave device 235, depending on the circuitry 210 configuration.

Referring to FIG. 3, in operation the slave device 235 monitors or collects data from the load 240. The master/slave device 200 requests data from the slave device 235 over the closed protocol network 209 (block 300). The slave device collects the data (block 305), such as monitoring or measurement, etc., and sends the requested data to the master/slave device 200 over the closed protocol network 209 (block 310) using a first protocol. The data is received by the device circuitry 210, which includes a processor (not shown) which is further configured to process both data from the load/power system 201 and incoming data form slave devices (block 315). Upon receipt of the data, a function is performed on the data (block 320). This function may include, for example, a power management function, and will be explained in detail later on. The master/slave device 200 then converts the processed data into an open non-proprietary protocol (block 330), commonly referred to as open protocols to one skilled in the art, such as HTTP. The data is then passed to the server module 230 where the server makes the new data available (block 340), for viewing, retrieval or transmission. A client application 220, such as a web browser, can then view the data over an open protocol network 207 from the server module 230 (block 350). For example, the server module 230 may receive a request from the client application 220 to view the aggregated usage data from load 201 and load 240. The server module 230 receives and processes the request. If the data is available, the server module 230 serves it to the client application 220 via the network 207. If the data is not available, the server module 230 passes the request to the device circuitry 210. The device circuitry 210 then requests the current usage data for load 240 from the slave device 235 using the closed network 209. The slave device then responds with the requested data. The device circuitry 210 also obtains the usage data for load 201. The usage data for load 240 and 201 is then aggregated and the combined usage data is passed back to the server module 230 which then serves it to the client application 220.

Referring to FIG. 3, in operation the slave device 235 monitors or collects data from the load 240. The master/slave device 200 requests data from the slave device 235 over the closed protocol network 209 (block 300). The slave device collects the data (block 305), such as my monitoring or measurement, etc., and sends the requested data to the master/slave device 200 over the closed protocol network 209 (block 310) using a first protocol. The data is received by the device circuitry 210, which includes a processor (not shown) which is further configured to process both data from the load/power system 201 and incoming data form slave devices (block 315). Upon receipt of the data, a function is performed on the data (block 320). This function may include, for example, a power management function, and will be explained in detail later on. The master/slave device 200 then converts the processed data into an open non-proprietary protocol (block 330), commonly referred to as open protocols to one skilled in the art, such as HTTP. The data is then passed to the server module 230 where the server makes the new data available (block 340), for viewing, retrieval or transmission.

A client application 220, such as a web browser, can then view the data over an open protocol network 207 from the server module 230 (block 350). For example, the server module 230 may receive a request from the client application 220 to view the aggregated usage data from load 201 and load 240. The server module 230 receives and processes the request. If the data is available, the server module 230 serves it to the client application 220 via the network 207. If the data is not available, the server module 230 passes the request to the device circuitry 210. The device circuitry 210 then requests the current usage data for load 240 from the slave device 235 using the closed network 209. The slave device then responds with the requested data. The device circuitry 210 also obtains the usage data for load 201. The usage data for load 240 and 201 is then aggregated and the combined usage data is passed back to the server module 230 which then serves it to the client application 220.

In a second embodiment, a local display client 250 is provided on the master device 200 and is configured to view the data from the server module 230 using an open protocol. The local display client 250 may include a LCD display for display a graphic user interface. For example, the local display client 250 may be configured to operate Internet Explorer™, or a derivative thereof, manufactured by Microsoft Corporation, located in Redmond Wash., and thus provide the user with local viewing of the data associated with the attached slave device 235.

In a third embodiment the server module 230 is further capable of serving email, FTP file transfers, NNTP, instant messaging and building and publishing web pages. Further, a domain name system ("DNS") address for the server is also utilized. Both static and dynamic DNS service can be utilized by the server module 230.

In a fourth embodiment the Master Device receives data in a first protocol (block 310), such as ION protocol, performs a function on the data (block 320) and converts the new processed data back into the first protocol (block 335). As described above the data is then passed to the server module 230 where the server makes the new data available (block 340), for viewing, retrieval or transmission. A client application 220 can then view the data over the open protocol network 207 from the server module 230 (block 350).

Figure 4A:
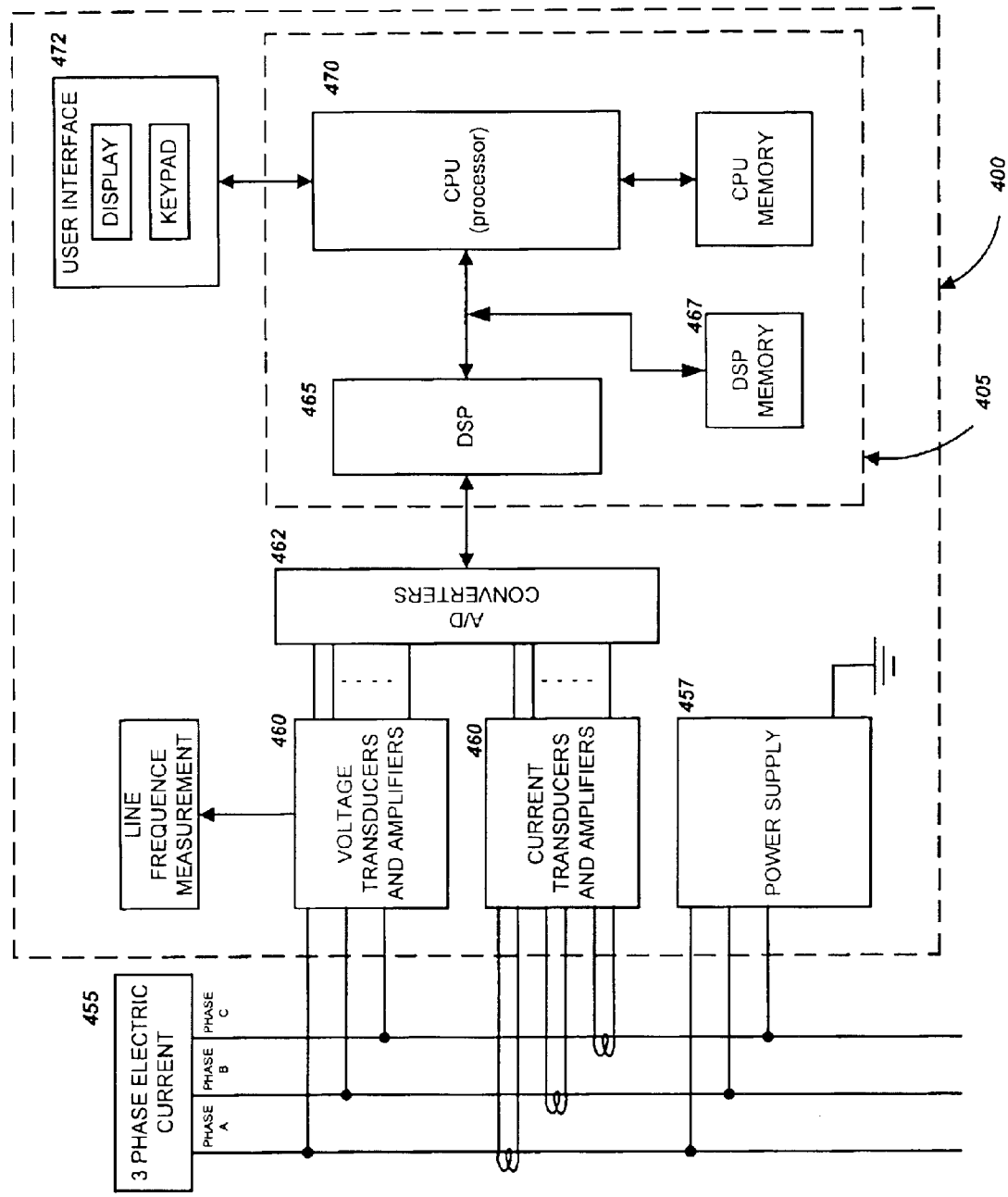
FIG. 4a illustrates an IED block diagram of the hardware of the preferred embodiment.
Figure 4B:
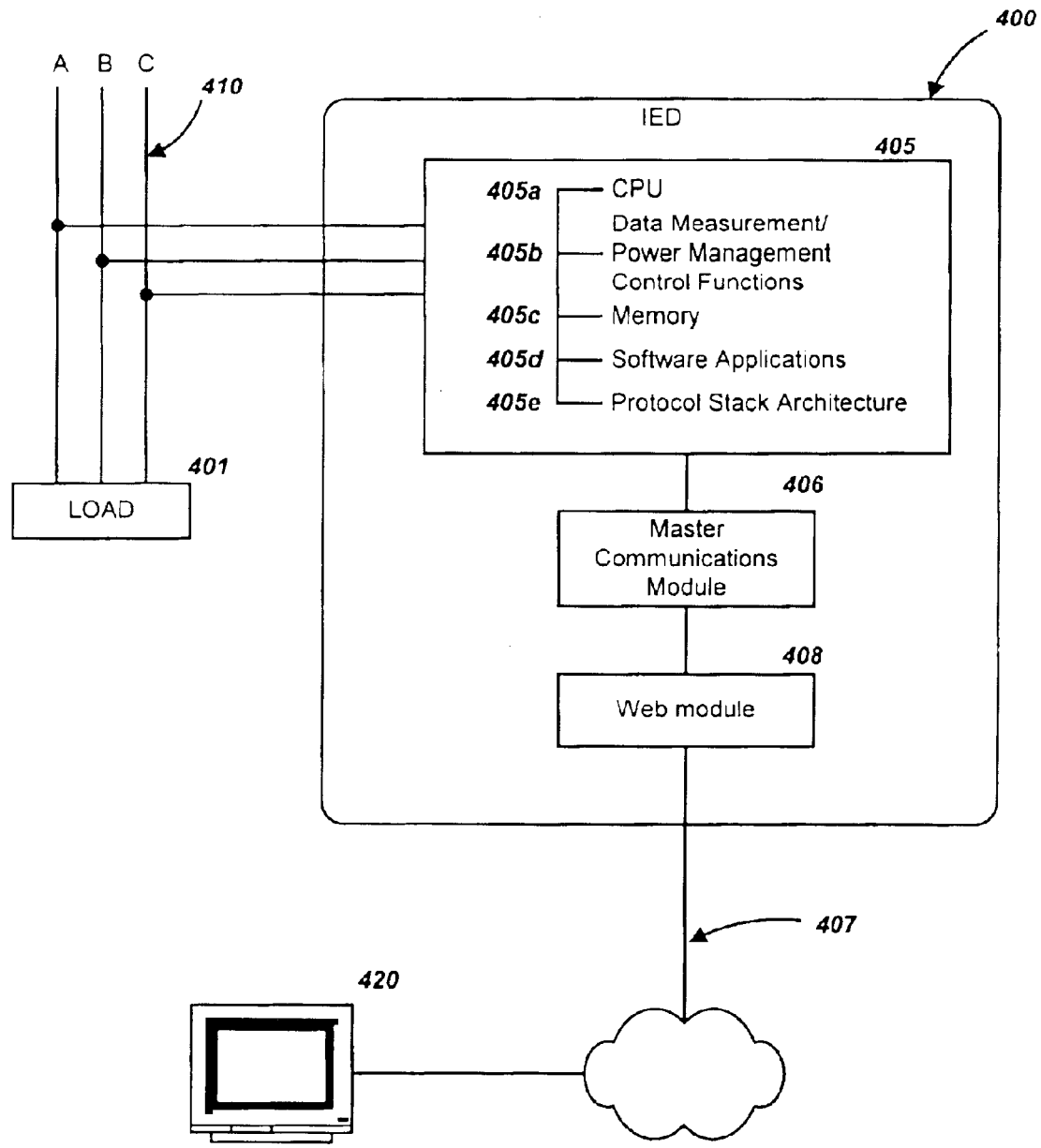
FIG. 4b illustrates an IED connected to a power system.

FIG. 4b illustrates a third embodiment of an IED 400 for use in a power management or control architecture. It will be appreciated that the IED 400 contains the device circuitry 405 as shown in FIG. 4a, but with additional components, as will be described later. The IED 400 is preferably coupled with a load 401 via a power distribution system 410, or portion thereof. The IED 400 includes device circuitry 405 and is further coupled with a network 407. A device, such as a computer, executing a web/HTML browser program 420, such as Internet Explorer™ is also attached to the network 407. In the preferred embodiment the web browser 420 is located on a computer, such as a personal computer having at least 32 MB memory and 1 GB hard disk with a Pentium™ or equivalent processor or better, executing the Microsoft Windows 98™ operating system and Microsoft Explorer™ or equivalent.

Preferred embodiment algorithms detailed below operate on signal samples as provided by the DSP 465 and CPU 470. The algorithms may operate on all samples provided or a subset of them. Typically, they operate utilizing 64 samples which represents ½ cycle. It will be appreciated however, that these computations can be performed with a greater or lesser number of samples (with the corresponding buffers adjusted accordingly), e.g. representing a quarter cycle or eighth of a cycle, down to a single sample. The processing power of the DSP 465 and CPU 470 is a limiting factor. The CPU 470, DSP 465, DSP memory 467 form part of the device circuitry 405 as is mentioned both earlier and later on.

The CPU 470 is also connected to a user interface 472 which allows users to program the meter 400 or retrieve revenue or power quality data and generally interact with the meter 400. In the preferred embodiment, the user interface 472 includes a graphical display and a keypad as well as LED, infrared and optical interfaces. It will be appreciated by those skilled in the art that the power quality detection and reporting algorithms detailed herein can be executed by a variety of hardware configurations, all of which are known in the art. It can be appreciated that further communications circuitry is coupled with the CPU 470, such as modem or Ethernet circuitry. An exemplary meter is a type 8500 manufactured by Power Measurement Ltd, located in Saanichton, B.C., Canada.

FIG. 4b illustrates a third embodiment of an IED 400 for use in a power management or control architecture. It will be appreciated that the IED 400 contains the device circuitry 405 as shown in FIG. 4a, but with additional components, as will be described later. The IED 400 is preferably coupled with a load 401 via a power distribution system 410, or portion thereof. The IED 400 includes device circuitry 405 and is further coupled with a network 407. A device, such as a computer, executing a web/HTML browser program 420, such as Internet Explorer™ is also attached to the network 407. In the preferred embodiment the web browser 420 is located on a computer, such as a personal computer having at least 32 MB memory and 1 GB hard disk with a Pentium™ or equivalent processor or better, executing the Microsoft Windows 98™ operating system and Microsoft Explorer™ or equivalent.

The device circuitry 405 includes the internal hardware and software of the device, such as the CPU 405a, memory 405c, firmware and software applications 405d, data measurement functions 405b and communications protocol stack 405e. The master communication module 406 couples the components of the device circuitry 405 of the IED 400 with the communications network 407. Alternate embodiments may have power management control functions 405b in place of or in addition to data measurement circuitry. For example, a relay may include a control device and corresponding control functions that regulate electricity flow to a load based on preset parameters. Alternatively, a revenue meter may include data measurement circuitry that logs and processes data from a connected load or other slave devices. IED's may contain one or the other or combinations of such circuitry. In an alternate embodiment the circuitry includes phasor monitoring circuits (not shown) which comprise phasor transducers that receive analog signals representative of parameters of electricity in a circuit over the power distribution system.

The device circuitry 405 interacts with a master communications module 406 which gives the device 400 master device functionality. The master communications module 406 includes software and/or hardware which allows the device 400 to communicate using a master protocol to other slave devices (not shown) attached to the network 407 or a secondary network (not shown). The device circuitry 405 converts the master protocol communication to a format which is readable using an open internet based protocol, such as HTTP. As described above, the device circuitry 405 is configured to process the data contained within the master protocol communication format before reconfiguring the data into the second protocol. Data processing may include power management functions such as data aggregation, data scaling, measuring power consumption, controlling power distribution such as a relay function, monitoring power quality, measuring power parameters such as phasor components, voltage or current, frequency, energy, power, controlling power generation facilities, or combinations thereof. Other power management commands and functions or data processing functions are known to those skilled in the art. An exemplary device that provides such power management functions is the model 8500 meter, manufactured by Power Measurement Ltd, in Saanichton, B.C. Canada.

Further, the device circuitry 405 is also coupled with a web module 408 which performs web server functionality. A web server is a program that, using the client/server model and HTTP, serves files, which include data, from the web server to a user as web pages. Web servers also allow functionality such as serving email, instant messaging, FTP file transfers and building and publishing web pages. A client/server model describes the relationship between two connecting devices in which one program, the client, makes a request form another program, the server, which fulfills the request. The client/server model provides a way to interconnect devices and programs that are distributed across different locations. The web module's 408 server functionality further facilitates two way communications between a non-proprietary client application and the slave device. In one embodiment the web module 408 allows the device 400 to communicate using a non-proprietary protocol over the network 407. Referring to FIG. 4 the device 400 acts as the server and the web browser 420 acts as the client. The circuitry also allows for manipulation and/or processing of the data received from the slave devices before communication over the network with the open protocol. The open protocol is a standard communication/application layer protocol such as HTTP, SOAP or XML which is compatible with an Ethernet network protocol, such as a TCP/IP communications protocol, which is commonly utilized on a web browser 420. It will be appreciated that other network interfaces, such as wireless networks, may be utilized.

Figure 5:
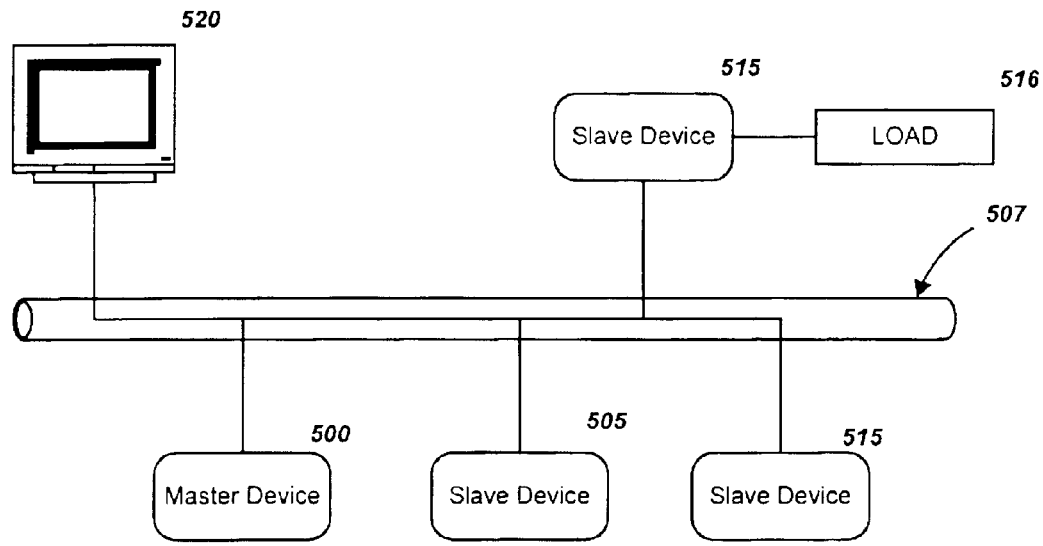
FIG. 5 illustrates a master IED coupled with several slave devices and a viewing device attached to one network.
Figure 6:
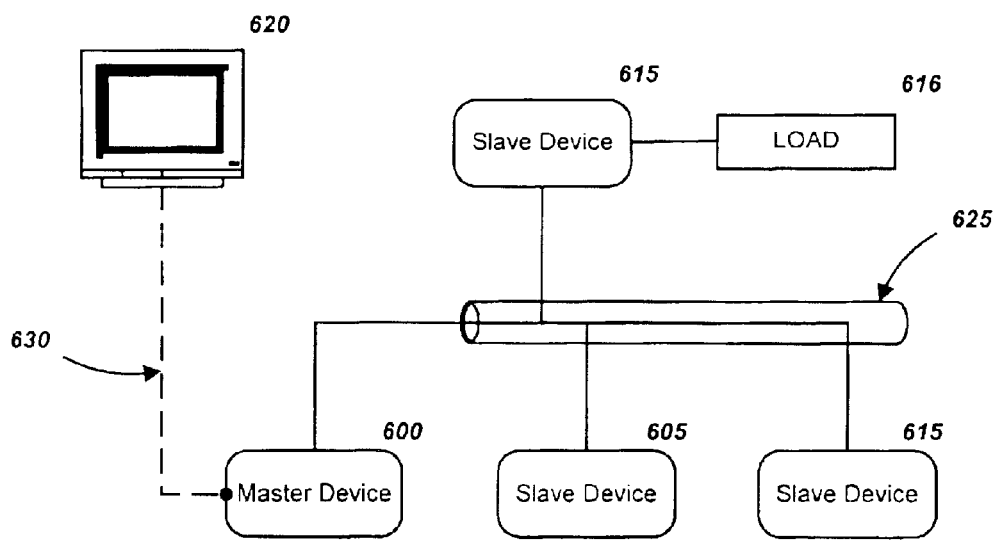
FIG. 6 illustrates a master IED coupled with several slave devices and a viewing device attached to a separate network.

FIG. 5 illustrates a device 500, including a master communications module as described above, with several slave devices 505, 510, 515, all attached to a network 507. In the preferred embodiment a master meter 500 is coupled with a network 507, the master meter 500 having the functionality to send, receive or communicate with the slave devices 505, 510, 515 using a master protocol. It will be appreciated that the slave devices 505, 510, 515 may be connected to corresponding loads or power systems, for example, load 516 is coupled with slave device 515. As discussed earlier master protocols include protocols such as Modbus Master, ION, DNP, Lonworks™ or IEC 870 standard protocols. The master meter 500 is further coupled with a viewing device 520, such as a web browser. The master meter 500 utilizes a server to communicate with the viewing device 520 using a standard viewing protocol, the viewing protocol different from the master protocol. A user may utilize the viewing device 520 which enables them to view data from a slave device 505 through the master meter 500 without requiring the ability of the viewing device 520 to communicate in the master protocol. In one embodiment the network 507 is an Ethernet network which allows the slave devices 505, 510, 515, the master meter 500 and the viewing device 520 capability to communicate over a singular network.

Figure 7:
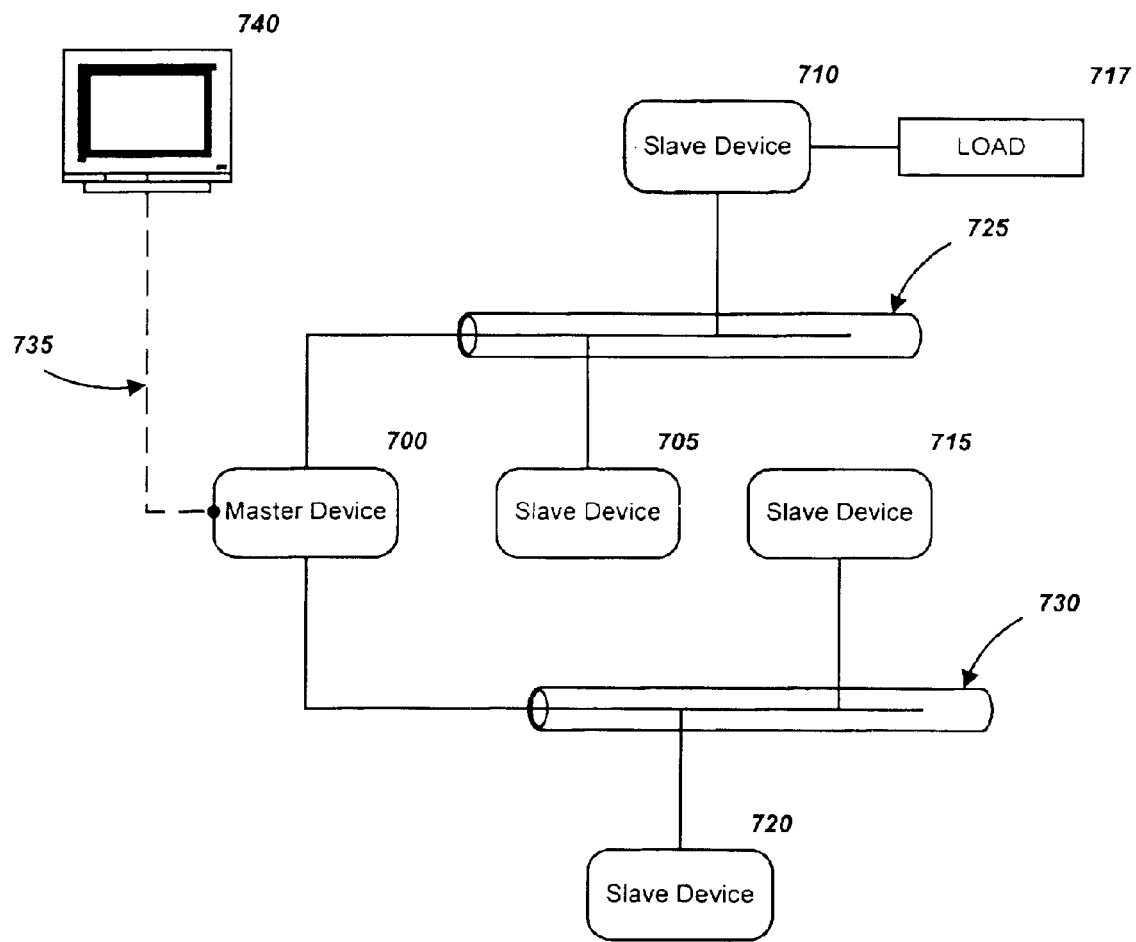
FIG. 7 illustrates a master IED coupled with multiple networks, each network having it's own protocol.

FIG. 7 illustrates an alternate embodiment where a master device is coupled with several smaller networks, each network having it's own protocol. In this embodiment the communication module on the master device 700 facilitates two way communications between the non-proprietary client application 740 and the slave device 705 710 715 720. For example, the first network 725 communicates between devices 705 710 using a Modbus protocol and the second network 730 communicates between devices 715 720 using the ION protocol. The master device 700 communication circuitry is coupled with the slave devices 705 710 715 720 on either network 725 730, thereby allowing the master device 700 to send, receive or respond to data or commands sent from the slave devices. As described earlier the device circuitry converts and processes the data or commands from the proprietary protocol such as the Modbus protocol or the ION protocol, to a third common Internet network open protocol, such as HTTP. The master device's 700 web server allows the viewing device 700 to view the data over the network 735. It will be appreciated by one skilled in the art that the data or command communication between slave devices 705 710 715, the master device 735 and the viewing device 740 can be bi-directional.

In operation, the master device 600 utilizes two ways of gathering data from slave devices. The first is "poll and display" where the master device 600 continuously contacts the slave devices and requests updates of their measured/sensed data. In operation the meter polls for data from the slave devices using the necessary protocol. The slave device responds and provides the requested data. The meter processes the received data and converts it to a second, more readily accessible format, such as HTML. The data is then made available via the meter's internal web server for any HTML client program to access and view. Alternately the master device 600 "polls and stores" data, also continuously contacting the slave devices to request their data and then processing and storing the processed data. Storing the processed data on the master device 600 for later retrieval reduces the need for the master device 600 to continuously post the data with its web server and allows the data to be requested or retrieved by a secondary device via the web server. It will be appreciated that retrieval of the stored data may be done via the secondary viewing device directly or done via a transmission device, such as an email server.

The second way the master device 600 facilitates the transferring of data is when it is activated by the viewing device 620. In operation, a user operates a web browser, such as Microsoft Internet Explorer™, and requests data from the load 616 which presents data to the slave device 615, then to the master device 600. The data transmission is done using a master protocol and upon receipt by the master device 600, the data is extracted from the transmission. The master device performs a function, described below, on the data and then converts the new data into a protocol viewable by the web browser, such as HTML. As described earlier a function, such as a power monitoring or measurement function, may include data aggregation, measuring power consumption, controlling power distribution such as a relay function, monitoring power quality, measuring power parameters such as phasor components, voltage or current, controlling power generation facilities, or other computations or combinations thereof. It will also be appreciated that control commands, such as disconnect the load 616, can be issued from the web browser 620 in a protocol or format such as XML or SOAP, which are routed to the master device 600 and converted into the master protocol in which the slave device 615 communicates. Standard web client software is onboard the master device, which is accessible by an Internet connection.

FIG. 7 illustrates an alternate embodiment where a master device is coupled with several smaller networks, each network having it's own protocol. In this embodiment the communication module on the master device 700 facilitates two way communications between the non-proprietary client application 740 and the slave device 705, 710, 715, 720. For example, the first network 725 communicates between devices 705 710 using a Modbus protocol and the second network 730 communicates between devices 715, 720 using the ION protocol. The master device 700 communication circuitry is coupled with the slave devices 705, 710, 715, 720 on either network 725, 730, thereby allowing the master device 700 to send, receive or respond to data or commands sent from the slave devices. As described earlier the device circuitry converts and processes the data or commands from the proprietary protocol such as the Modbus protocol or the ION protocol, to a third common Internet network open protocol, such as HTTP. The master device's 700 web server allows the viewing device 700 to view the data over the network 735. It will be appreciated by one skilled in the art that the data or command communication between slave devices 705, 710, 715, the master device 735 and the viewing device 740 can be bi-directional.

In operation, the master device 700 is configured to "poll and display" data from the first network 725 and its associated slave devices 705, 710, continuously requesting the data from the slave devices 705, 710, processing the data and transmitting the data on a third network 735 to a users viewing device such as a web browser 740. The second network 730, which communicates data or commands in a different protocol from the first network 725, is also connected to the master device 700. The master device 700 continuously contacts the slave device 715 on the second network 730 requesting data. It will be appreciated that the master device 700 offers a user the opportunity to access data or send commands to all slave devices 705, 710, 715, while three separate networks and three separate protocols are utilized.

The master meter 700 is further configured to respond to a slave device's data with a power management function. For example, the slave device 715 is connected to an associated load 717 and the master device 700 continuously requests the measured parameters of the load 717 which the slave device 710 is configured to measure. These parameters are, for example, current, voltage, energy, power, peak power demand, current demand, peak current demand, frequency, power factor, per phase power or power factor, reactive and apparent energy, reactive and apparent power or power reliability, or combinations thereof. A power management function may involve, for example, a test and response to one of the measured parameters or processed pieces of data or a general command or control instruction issued to a device. For example the master device 700 continuously requests the voltage usage data of the load 717 from the slave device. The master device 700 is also configured to employ a power or energy management command or function, such as to indicate an alarm to a user and initiate a load shedding command when the measured voltage of the load exceeds a predefined level.

Other power management functions include either one or combinations of alert functions, reporting functions, load control functions, data collection functions, device management functions, billing or revenue management functions, distributed power management functions, centralized power management functions, power reliability functions, usage or consumption management functions, electrical power generation management functions, device maintenance functions, device fraud detection functions, power outage functions or power quality monitoring or measurement functions. It will be appreciated that these functions can be initiated or controlled by the master device, the master device being accessible from a viewing device, such as a web browser. In one embodiment the IED's functionality is controlled using object oriented program modules. Object oriented programming, known in the art, allows users to manipulate or perform functions or data in relation to each other. An IED utilizing object oriented programming is described in U.S. Pat. No. 5,650,936.

Figure 8:
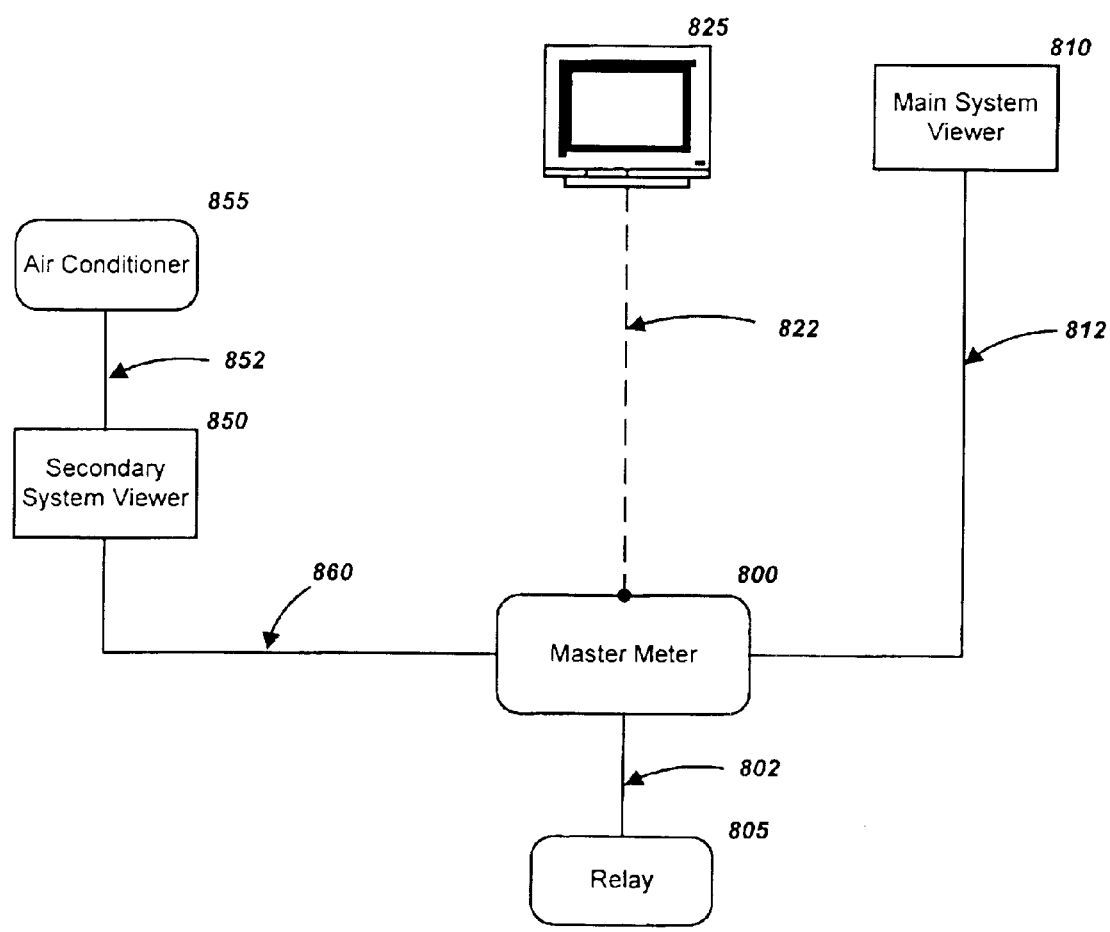
FIG. 8 illustrates a preferred embodiment with a master IED coupled to multiple networks, the master IED providing protocol translation or conversion between the networks.

In an alternate embodiment the master device allows protocol translation or conversion between two systems, as well as their associated devices. For example, as shown in FIG. 8, a master device 800, or meter with a protocol conversion module (not shown) within the meter circuitry, is coupled with a relay 805 via the relay network 802. The relay network 802 is a serial RS232 connection which communicates using the Modbus protocol, the master meter 800 continuously requests and receives data from the relay 805 using the Modbus protocol. A user may view the relay data in two locations. First, the master meter's protocol conversion module receives the data from the relay 805 in a Modbus protocol and converts the data into the ION protocol and communicates with the main system viewer 810. In one embodiment the main system viewer 810 is an operating program, such as ION Enterprise™ or Pegasys™ manufactured by Power Measurement Ltd., which allows the user to both monitor and control both the master meter 800 and all associated loads or connected devices. Second, the user may view or control the data via a network 822 connection, such as an Ethernet connection, in a browser 825. In one embodiment the master meter 800 converting the data from the Modbus protocol into a common Internet protocol such as XML or HTML. The master meter 800 also allows a secondary system viewer 850, which communicates with an alternate protocol, such as BACnet to access the data. In one embodiment the master meter 800 processes and converts the data in the Modbus protocol on the relay network 802 to the alternate BACnet protocol in the secondary system network 860. The secondary system is, for example, a building air conditioning system which contains air conditioner devices 855. In an alternate embodiment the master meter 800 converts the data in the Modbus protocol on the relay network 802 to HTML, thereby allowing the browser 825 to view the data over the network 822. The master meter 800 further converts the HTML protocol to the BACnet protocol, thereby allowing the secondary system viewer 850 access to the data or commands. Thus, the master meter 800 acts as a protocol conversion device between multiple protocols and multiple networks while monitoring, measuring and implementing power management functions on connected devices.

Figure 9:
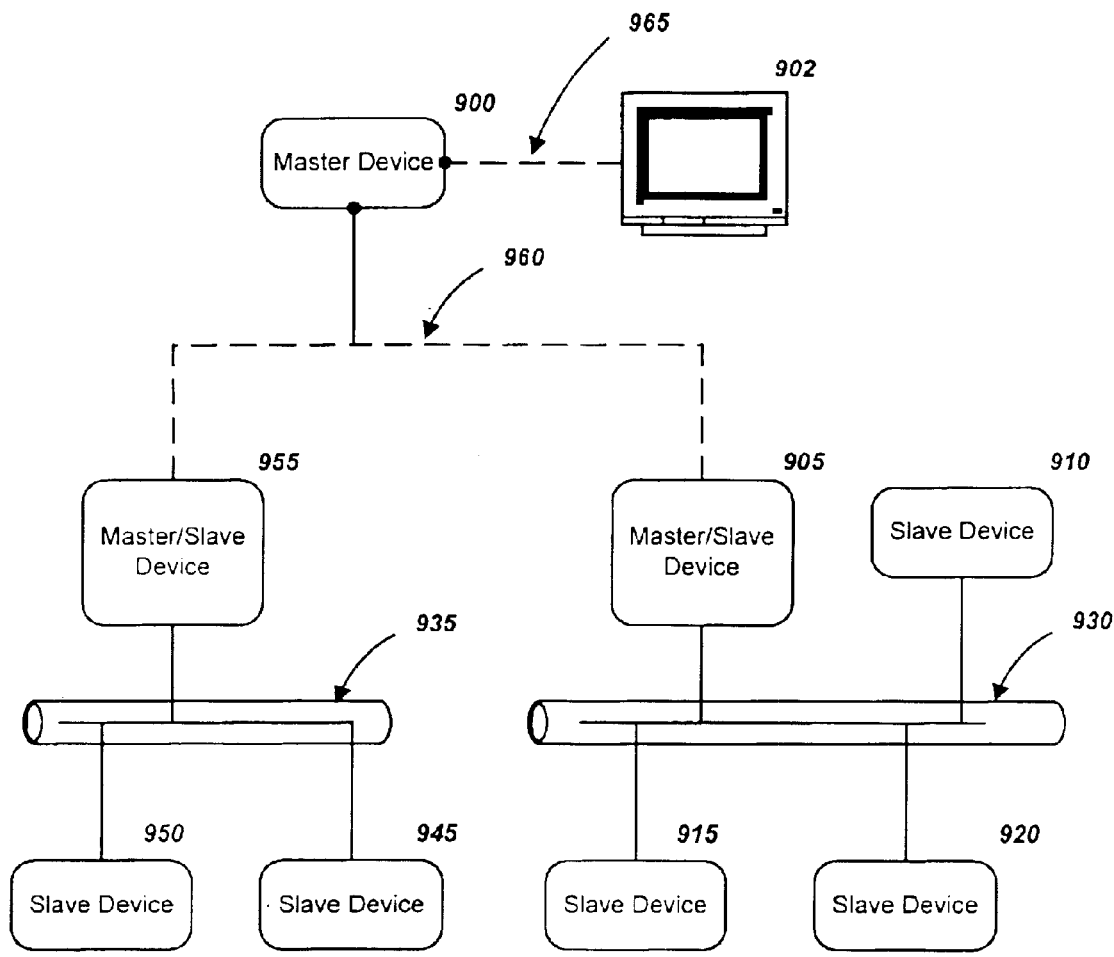
FIG. 9 illustrates a preferred embodiment of a device with both master/slave functionality.

It will also be appreciated that a slave device can also contain master device functionality. A device with master/slave functionality, as shown in FIG. 9, utilizes master functionality to aggregate and process data within sub-networks. For example, a master/slave device 955 is connected to several slave devices 945, 950 on a network 935. Another master/slave device 905 is also connected to slave devices 910, 915, 920 within another network 930. Both master/slave devices 905, 955 utilize master functionality, as described earlier, polling the data from the associated slave devices and performing functions, such as aggregation functions, on the data. Alternately, when the master device 900 requests data from the master/slave devices 905, 945, the master/slave devices 905, 945 utilize slave functionality. The master device 600 is configured to poll the data from only the master/slave devices 905, 955, thereby reducing the amount of connections and processing power that is required by the master device 900.

It is therefore intended that the foregoing detailed description be regarded as illustrative rather than limiting, and that it be understood that it is the following claims, including all equivalents, that are intended to define the spirit and scope of this invention.

We claim:

1. An energy meter for managing the distribution of electrical energy, said meter comprising:

at least one sensor coupled with an electric circuit and operative to sense at least one electrical parameter in said electric circuit and generate at least one analog signal indicative thereof;

a meter housing;

at least one analog to digital converter located in said meter housing and coupled with said at least one sensor and operative to receive said at least one analog signal and convert said at least one analog signal to at least one first digital signal;

a communications port located in said meter housing and operative to facilitate communications of at least one second digital signal between said energy meter and a slave device located outside of said meter housing and coupled with said energy meter using a first protocol;

a processor located in said meter housing and coupled with said at least one analog to digital converter and further coupled with said communications port, said processor operative to perform a power management function on said at least one second digital signal and generate an output result; and a server module located in said meter housing and coupled with said processor and operative to facilitate communication of said output result to a client application over a digital network located outside of said meter housing using a second protocol to manage the distribution of electrical energy.

2. The energy meter of claim 1 wherein said first protocol comprises a master protocol.

3. The energy meter of claim 2 wherein said master protocol comprises the Modbus RTU protocol.

4. The energy meter of claim 2 wherein said master protocol comprises distributed networking protocol ("DNP").

5. The energy meter of claim 1 wherein said second protocol comprises a hyper text transfer protocol ("HTTP") based protocol.

6. The energy meter of claim 5 wherein said HTTP based protocol comprises hypertext markup language ("HTML").

7. The energy meter of claim 5 wherein said HTTP based protocol comprises extensible markup language ("XML").

8. The energy meter of claim 5 wherein said HTTP based protocol comprises simple mail transport protocol ("SMTP").

9. The energy meter of claim 1 wherein said first protocol and said second protocol are similar.

10. The energy meter of claim 1 wherein said digital network comprises an Ethernet network.

11. The energy meter of claim 1 wherein said digital network comprises a wireless network.

12. The energy meter of claim 1 wherein said energy meter comprises at least one object oriented program module.

13. The energy meter of claim 1 wherein said meter is operative to request first digital data from said slave device, said slave device operative to provide said first digital data upon request.

14. The energy meter of claim 13 wherein said meter is further operative to request second digital data from a second slave device coupled with said meter, said second slave device being operative to provide said second digital data upon request.

15. The energy meter of claim 1 wherein said at least one second digital signal comprises digital data generated by said slave device.

16. A system for managing the distribution of electrical energy in an electric circuit, said system comprising:
  (a) a first digital network comprising a first protocol;
  (b) a second digital network comprising a second protocol different from said first protocol;
  (c) a first slave device coupled with said first digital network, said first slave device operative to facilitate communication of digital data onto said first digital network using said first protocol;
  (d) a master device coupled with said first digital network and said second digital network and further comprising:
    (i) at least one sensor coupled with said electric circuit and operative to sense at least one electrical parameter in said electric circuit and generate at least one analog signal indicative thereof;
    (ii) a meter housing, wherein said first and second digital networks and said first slave device are located outside said meter housing;
    (iii) at least one analog to digital converter located in said meter housing and coupled with said at least one sensor and operative to receive said at least one analog signal and convert said at least one analog signal to a digital signal representative thereof;
    (iv) a communications port located in said meter housing and operative to couple said master device with said first digital network and to facilitate receipt of said digital data from said first digital network using said first protocol;
    (v) a processor located in said meter housing and coupled with said analog to digital converter and further coupled with said communications port, said processor operative to perform a power management function on said digital data and generate an output result therefrom;
    (vi) a server module located in said meter housing and coupled with said processor and operative to facilitate communication of said output result over said second digital network using said second protocol to manage the distribution of electrical energy in said electric circuit.

17. The system of claim 16 further comprising a second slave device coupled with said first digital network and further operative to communicate with said master device using said first protocol.

18. The system of claim 17 wherein said master device receives a plurality of said digital data from both said first slave device and said second slave device, said processor operative to perform said power management function on said digital data and generate said output result.

19. The system of claim 16 wherein said power management function comprises generating an alarm message.

20. The system of claim 16 wherein said power management function comprises generating a load shedding command.

21. The system of claim 16 wherein said power management function comprises generating a power factor control command.

22. The system of claim 16 wherein said first slave device is an energy meter.

23. The system of claim 16 further wherein said first slave device facilitates communication of said digital data in response to a request from said master device.

24. The system of claim 16 wherein said first slave device is further coupled with a load, said slave device operative to at least one of monitor and control said load.

25. A system for managing the distribution of electrical energy in an electric circuit, said system comprising:
  (a) a first digital network;
  (b) a master device and a slave device each coupled with said first digital network and each further comprising:
    (i) at least one sensor coupled with a portion of said electric circuit and operative to sense at least one electrical parameter in said electric circuit and generate at least one analog signal indicative thereof;

(ii) a meter housing, wherein said first digital network is located outside of said meter housing, and further wherein said master device is located outside of said meter housing of said slave device and said slave device is located outside said meter housing of said master device;

(iii) at least one analog to digital converter located in said meter housing and coupled with said at least one sensor and operative to receive said at least one analog signal and convert said at least one analog signal to digital data representative thereof;

(iv) a communications port located in said meter housing and coupled with said at least one analog to digital converter and operative to facilitate communication of said digital data onto said first digital network;

(v) a processor located in said meter housing and coupled with said at least one analog to digital converter, said processor operative to perform a power management function on said digital data and generate an output result;

wherein said master device further comprises a server module located in said meter housing and coupled with said processor of said master device and operative to facilitate communication of said output result on a second digital network using a first protocol, said first protocol comprising an open protocol, to manage the distribution of electrical energy in said electric circuit.

26. The system of claim 25 wherein said master device comprises a revenue meter.

27. The system of claim 25 wherein said master device is operative to communicate with a plurality of slave devices.

28. The system of claim 25 wherein said master device is operative to communicate with a plurality of slave devices using an RS232 protocol.

29. The system of claim 25 wherein said master device is operative to communicate with a plurality of slave devices using an RS485 protocol.

30. The system of claim 25 wherein said slave device facilitates communication using a second protocol, said second protocol different from said first protocol, further wherein said second protocol comprising a closed protocol.

31. The system of claim 30 wherein said closed protocol comprises Modbus RTU protocol.

32. The system of claim 30 wherein said closed protocol comprises distributed networking protocol ("DNP").

33. The system of claim 25 wherein said open protocol comprises a hypertext transport protocol ("HTTP") based protocol.

34. The system of claim 33 wherein said HTTP based protocol comprises extensible markup language ("XML").

35. The system of claim 33 wherein said HTTP based protocol comprises hypertext markup language ("HTML").

36. The system of claim 33 wherein said HTTP based protocol comprises simple mail transport protocol ("SMTP").

37. The system of claim 25 wherein said master device is operative to export said output result to a third device.

38. The system of claim 37 wherein said third device is operative to perform a power management function on said digital data.

39. The system of claim 38 wherein said power management function comprises an aggregation function.

40. The system of claim 38 wherein said power management function comprises a billing function.

41. The system of claim 38 wherein said power management function comprises a protection function.

42. The system of claim 38 wherein said power management function comprises a control function.

43. The system of claim 25 wherein said first digital network is coupled with said second digital network.

44. A method for managing the distribution of electrical energy in an electric circuit, said method comprising:

(a) Computing a first data value in a slave device located in a first location and coupled with a first network, said first network implementing a master protocol;

(b) transmitting said first data value to a master device from said slave device over said first network, said master device located in a second location different from said first location;

(c) receiving said first data value by said master device;

(d) receiving at least one analog parameter by said master device from a power distribution network coupled with said master device;

(e) performing at least one power management function by said master device on said first data value and generating a result; and (f) providing said result by said master device to a client application coupled with a second network, said second network implementing an internet protocol, to manage the distribution of electrical energy in said electric circuit.

45. The method of claim 44, wherein (a) further comprises receiving a command via said first network from said master device coupled with said first network.

46. The method of claim 45, wherein (b) is in response to said command.

* * * * *